Figure 4:
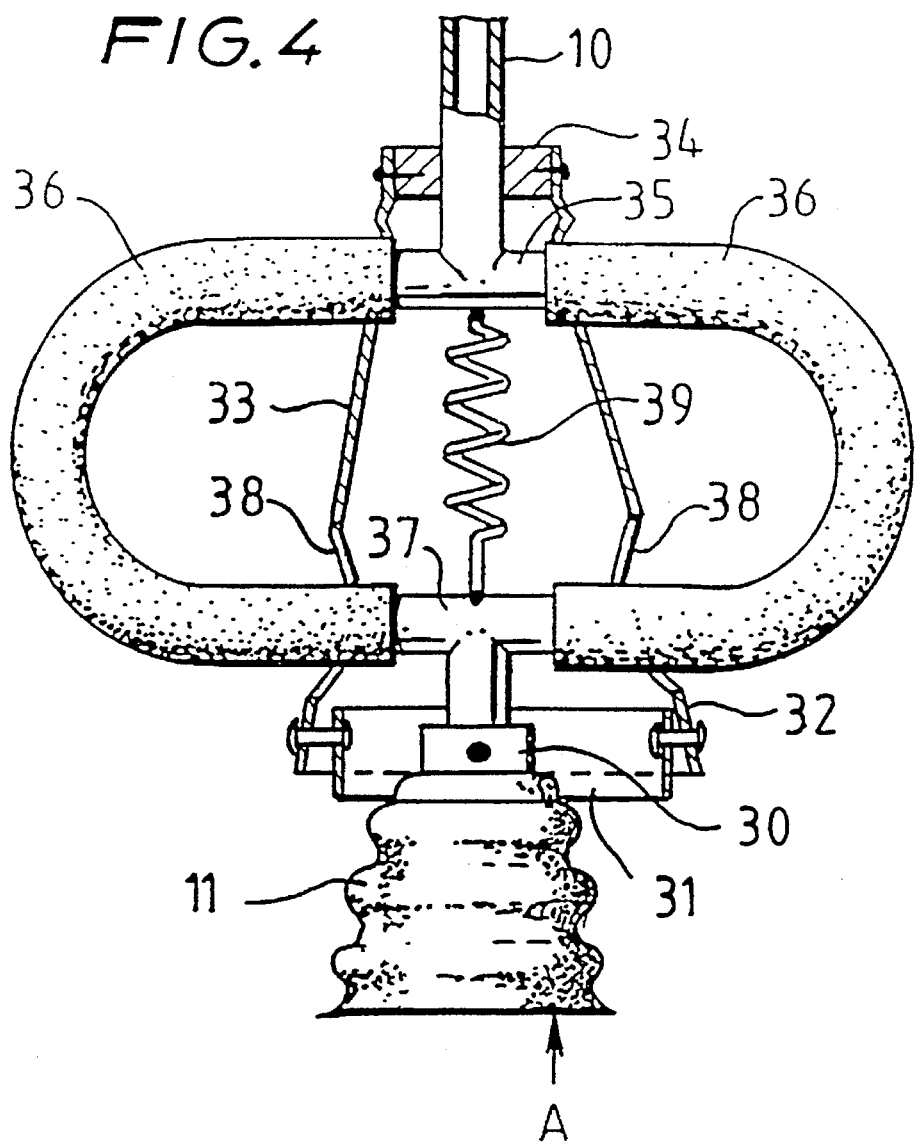

United States Patent

Wheeler et al.

[11] Patent Number: 5,491,965
[45] Date of Patent: Feb. 20, 1996

[54] SUCTION CUP ASSEMBLIES

[75] Inventors: Geoffrey C. Wheeler, Truro; Tony A. Russell, Norfolk, both of United Kingdom

[73] Assignee: Priorlucky Limited, Great Yarmouth, United Kingdom

[21] Appl. No.: 290,963

[22] PCT Filed: Feb. 9, 1993

[86] PCT No.: PCT/GB93/00342

§ 371 Date: Aug. 19, 1994

§ 102(e) Date: Aug. 19, 1994

[87] PCT Pub. No.: WO93/16582

PCT Pub. Date: Sep. 2, 1993

[30] Foreign Application Priority Data

Feb. 21, 1992 [GB] United Kingdom ............... 9203766

[51] Int. Cl.$^6$ ................................................ A01D 46/00
[52] U.S. Cl. ................................................ 56/327.1
[58] Field of Search ................................ 56/327.1, 12.9, 56/13.1, 10.2, 328.1, DIG. 8

[56] References Cited

U.S. PATENT DOCUMENTS 3,183,640  5/1965  Gee .
5,185,989  2/1993  Russell et al. ................ 56/327.1

FOREIGN PATENT DOCUMENTS 3036116  5/1982  Germany .
2237491  5/1991  United Kingdom .

Primary Examiner—Michael Powell Buiz
Attorney, Agent, or Firm—McGlew and Tuttle

[57] ABSTRACT

A compliant mounting to attach a suction cup (11) to a support rod (10) is configured so that tilting movement of the cup occurs in such a way that translation of the mouth of the cup is minimised. The effective centre of the cup pivotal movement should lie within the confines of, or closely adjacent the cup. In the embodiment this is achieved by providing a sleeve (50) having an open lower end across which is stretched a resilient membrane (52). The membrane has a central aperture in which is secured the cup (11). Tilting movement of the cup occurring by subjecting the cup to a one-sided force A results in a complex pivotal cup motion by deformation of the membrane (52).

12 Claims, 5 Drawing Sheets

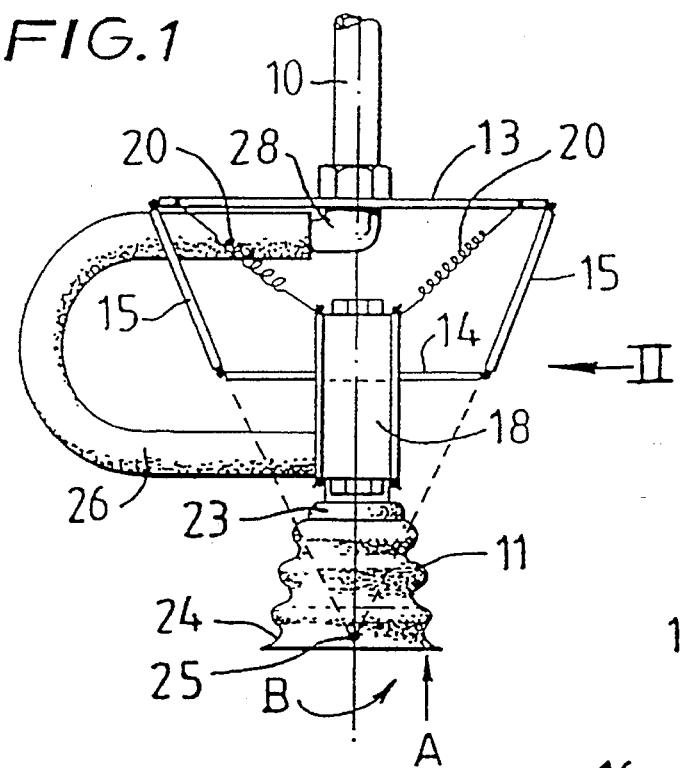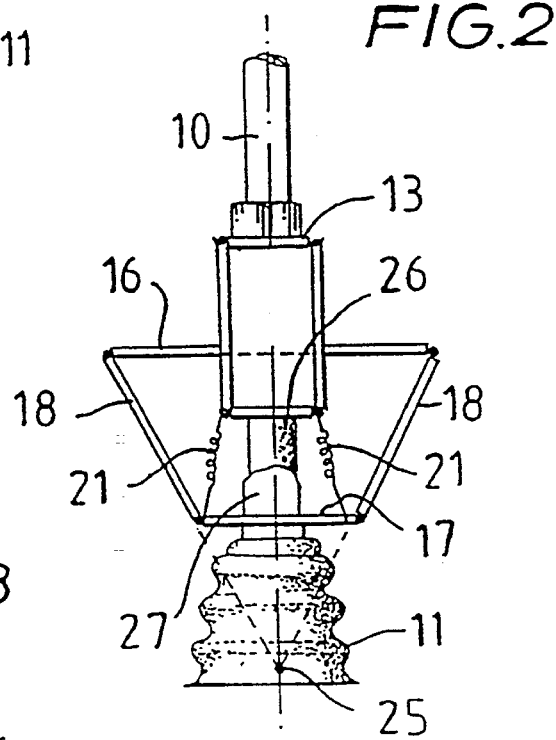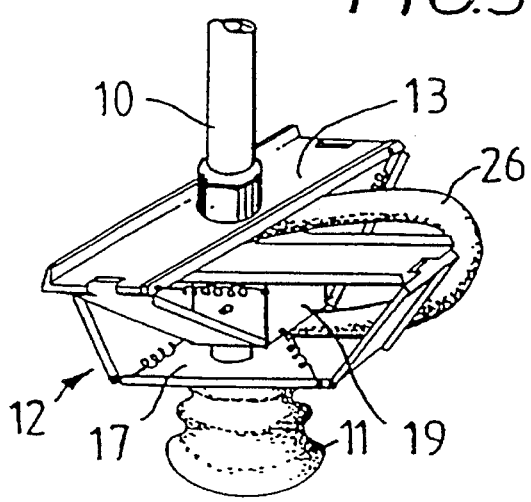

SUCTION CUP ASSEMBLIES

This invention relates to a suction cup assembly adapted to hold an article to permit the lifting thereof when suction is applied to the assembly. In particular—but not exclusively—this invention relates to such a suction cup assembly for use with produce, and especially mushrooms.

This invention is in particular concerned with a suction cup assembly which comprises a suction cup having at one end thereof an open mouth for contacting an article, a support member and a coupling mounting the other end of the cup on to an end portion of the member.

It is well-known to use a suction cup assembly of the kind just referred to, for the holding and lifting of an article by contacting that article with the suction cup assembly and applying suction (that is, a reduced pressure) thereto. The suction cup design depends to a large extent upon the nature of the article to be lifted; for example, in the case of a carton having a smooth and substantially impermeable outer surface, the suction cup may be relatively rigid and of a shallow axial depth. On the other hand, when handling delicate articles or articles of an irregular shape, it is more advantageous to use a relatively flexible suction cup of a greater axial depth, whereby the cup may deform as appropriate on contacting the article in order to achieve a good seal between the mouth of the cup and the article.

It has been proposed to harvest mushrooms from their growing medium by contacting the top of the mushroom cap with a suction cup, applying suction thereto and then lifting the cap and its stalk clear of the growing medium, perhaps with a simultaneous twisting movement, as described in our British Patent Specification No. 2,237,491. Though such apparatus performs adequately when the stalks of the mushrooms are substantially erect and the caps are disposed generally horizontally, it is found that there is a tendency for the caps to be broken from their stalks on being contacted by the suction cup, in the event that upper surfaces of the caps are not disposed generally horizontally. Moreover, should the picking assembly not be properly centred over the cap as the cup is moved to contact the cap, one side of the suction cup will contact the cap before the other side of the cup. This unequal loading on the cup tends to tilt the cup sideways, resulting in an increased tendency for the cap to be broken from its stalk as the vacuum is applied during harvesting.

It is known for example from DE-A-3036116 to mount a suction cup on a double universal coupling, to allow the cup to move transversely whilst the mouth of the cup remains parallel to a plane perpendicular to the axis of the mount. Such an arrangement is not suitable for the handling of delicate produce such as mushrooms, where the surface to be contacted by the cup may lie at some angle to said plane. An alternative arrangement is shown in U.S. Pat. No. 3183640, where a suction cup is mounted by way of a ball joint in a support rod. The mouth of the cup performs a significant lateral movement as the cup pivots about the ball joint, and if this arrangement is used in a mushroom harvester, there is a risk that a mushroom cap will be broken off its stalk should the part of the mushroom contacted by the cup lie in a plane not perpendicular to the axis of the support.

It is a principal object of the present invention to provide a suction cup assembly suitable for use, for example, in a produce-handling installation such as an automated mushroom harvesting plant, which assembly may be used either with irregularly-shaped articles or with articles having a surface for contact by the suction cup lying in a plane oblique to the mouth of the cup.

According to one aspect of the present invention, in a suction cup assembly of the kind described, the coupling is arranged to allow the cup to perform a generally pivotal movement with respect of the axis of the member, characterised in that the coupling includes means to control the effective centre of said generally pivotal movement to lie within the confines of the cup when the cup is at least partially compressed on one side.

It will be appreciated that in the assembly of this invention, the cup is able to perform a generally pivotal movement with respect to its support member, but that the effective centre of such pivotal movement is disposed nearer the open mouth of the cup than were a flexible joint to be provided between the support member and the cup itself. In this way, lateral translation of the mouth of the cup is minimised should the cup perform pivotal movement; in turn, this reduces the lateral stresses applied to an article contacted by the cup. In the case of the harvesting of mushrooms, it has been established that a minimisation of lateral movement is important, to reduce the likelihood of a mushroom being broken from its stalk.

It is known to provide a suction cup assembly wherein the suction cup is compressible in the axial direction, for example by providing convolutions in the side wall of the cup. When such a suction cup is used in an assembly of this invention, it is advantageous for the effective centre of said pivotal movement to lie within the confines of the cup when at least partially compressed. The optimum may be for the effective centre to lie substantially in the plane of the mouth of the suction cup, when the cup has been at least partially compressed axially. In this way, lateral translation of the mouth of the cup may be reduced to a minimum as the mouth of the cup contacts an article surface lying obliquely to the normal plane of the mouth.

According to another aspect of this invention, in a suction cup assembly of the kind described, the coupling includes a sleeve mounted on the end portion of the support member, a resilient membrane extending over the end of the sleeve remote from the support member, and the other end of the suction cup being carried by the membrane such that the cup may perform e pivotal movement by resilient deformation of the membrane. The deformation characteristics of such a membrane may serve to have the effective centre of the pivotal movement between the two ends of the suction cup. In addition, the provision of the membrane allows a small degree of movement in the axial direction between the cup and the support member, permitting the absorption of forces as a cup contacts an article.

The effective centre of pivotal movement of the cup in the arrangement described above may be moved nearer the open mouth of the cup by providing a skirt for the cup-which surrounds with clearance the end of the cup remote from the mouth, the membrane extending between the free edge of that skirt and said sleeve mounted on the support member. The depth of the skirt may be selected so as to have the effective centre of pivotal movement-precisely where required.

According to a further aspect of this invention, in a suction cup assembly of the kind described, the coupling may take the form of a mechanism comprising a first pivoted four-bar trapezium linkage having a pair of normally parallel unequal-length bars the longer bar of which is mounted on the support member, and a second pivoted four-bar trapezium linkage also having a pair of normally parallel unequal-length bars the longer bar of which is mounted on the shorter bar of the first linkage substantially at right angles thereto, the suction cup being mounted on the shorter bar of the second linkage and the projections of the equal length bars of the first and of the second linkages all normally substantially intersecting at a point, there being biasing means to apply a resilient restorative force to the linkages tending to keep the unequal-length bars of the two linkages substantially parallel. By varying the angle between the parallel bars and the respective equal-length bars of each of the two linkages, the intersection point of said equal-length bars may be set where desired, this intersection point defining the effective centre for pivotal movement of the cup. Most advantageously, the intersection point is arranged to lie within the confines of the cup, adjacent the open mouth thereof, for the reasons described above.

It is preferred for a low pressure source to be connected to the cup by means of a flexible vacuum pipe which communicates with the interior of the cup, through said other end thereof, remote from the open mouth of the cup. Particularly when handling delicate produce such as mushrooms, the pipe should not significantly restrict the pivotal movement of the cup.

In order to reduce yet further the likelihood of damage to articles being contacted and lifted by the suction cup assembly, it is preferred for the coupling to provide at least some compliance between the support member and the cup. Such means may comprise a co-axial spring, or a ram having a piston and cylinder combination, the ram being adapted to be connected to a low pressure source in such a way that the ram is expanded when low pressure (suction) is applied thereto. Advantageously, the same low pressure source is connected to the ram as is connected to the suction cup, by means of a common low pressure line leading to the assembly. In this way, the ram may serve as a buffer between the support member and the suction cup, to minimise the transfer of force from the support member to the article as the article is contacted by the suction cup. Moreover, on releasing an article from the suction cup, super-atmospheric pressure may be applied both to the ram and to the cup, so blowing the article from the cup and simultaneously causing contraction of the ram, moving the cup away from the article.

According to yet another aspect of this invention, such compliance is obtained by the coupling of a cup assembly of the kind described comprising a sleeve mounted on the end portion of the support member, a collar slidably and tiltably disposed within the sleeve and a spring biassing the collar away from the support member, the cap being mounted on the collar whereby the cup may perform a generally pivotal movement with respect to the axis of the support member by the collar tilting within the sleeve.

Figure 5:
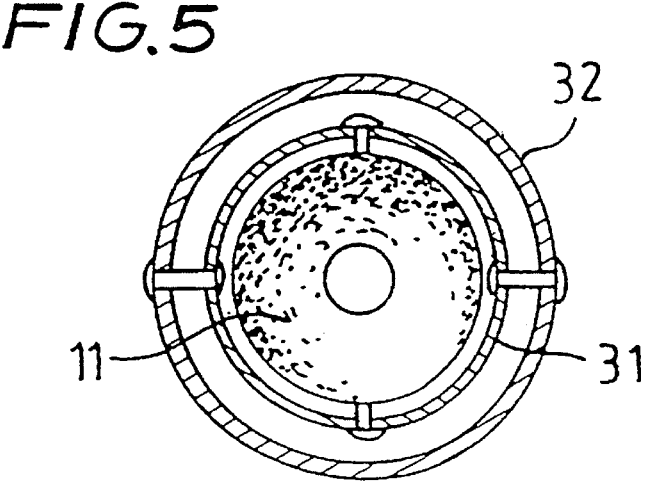
Figure 6:
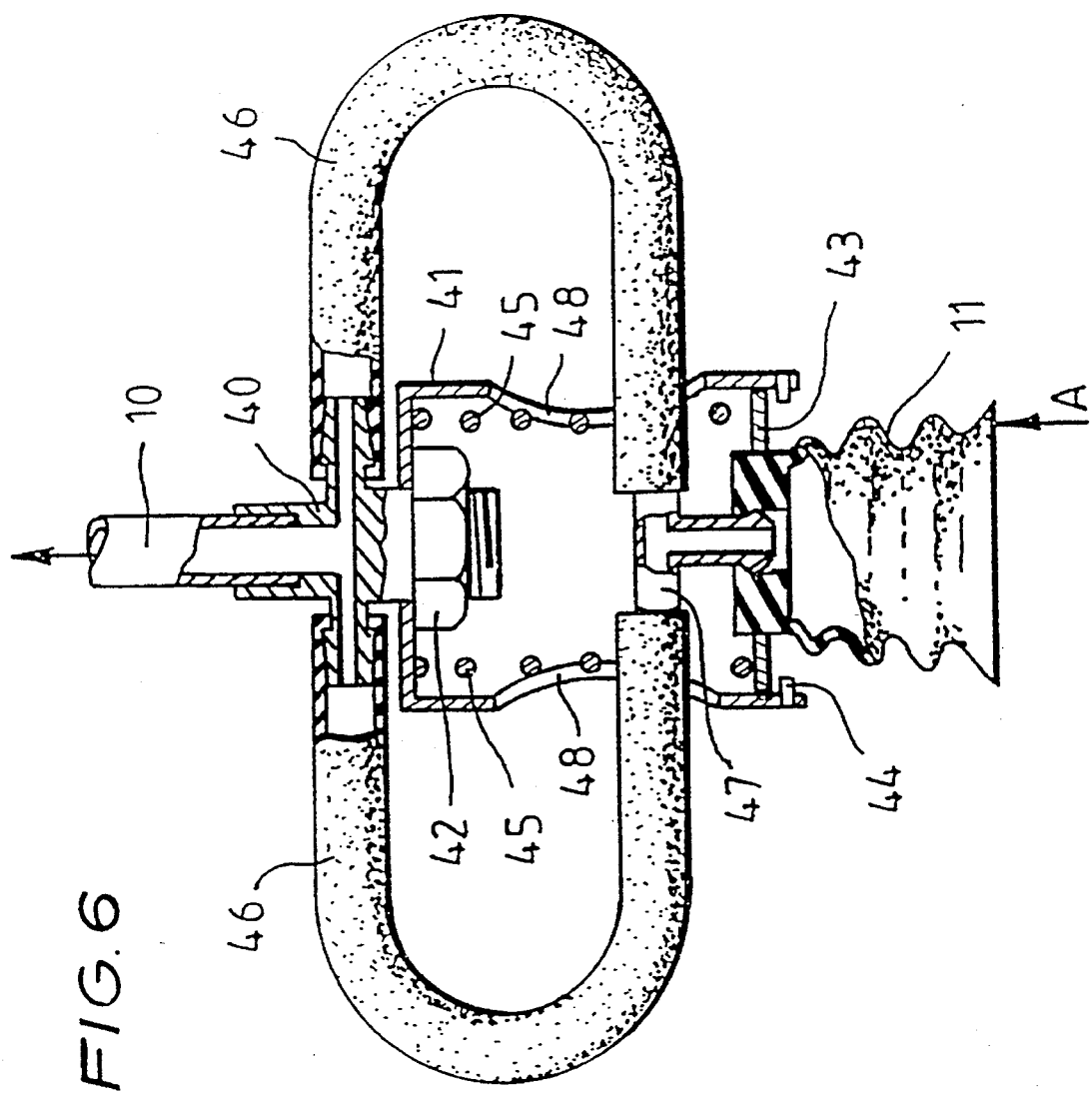
Figure 7:
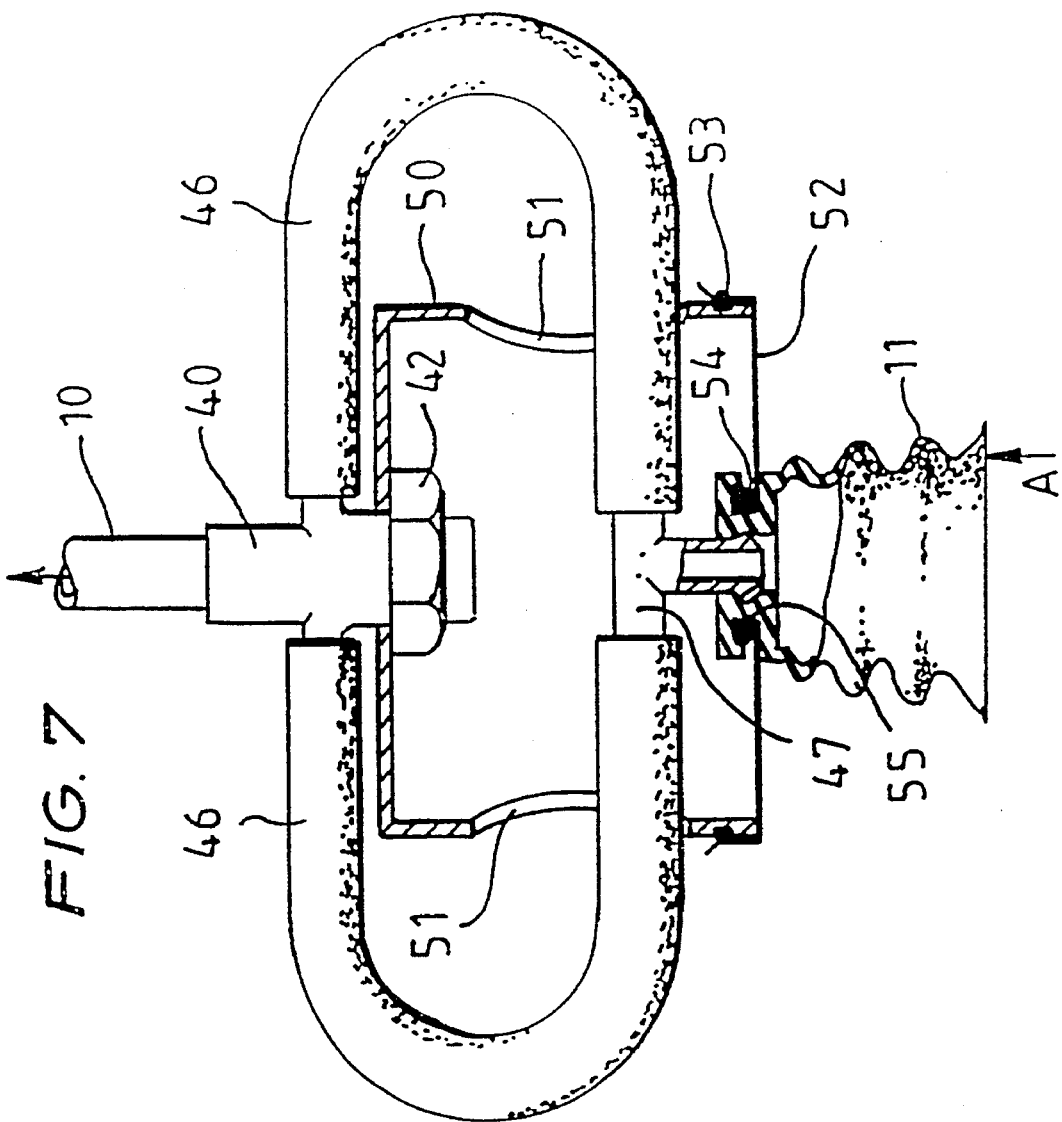
Figure 8:
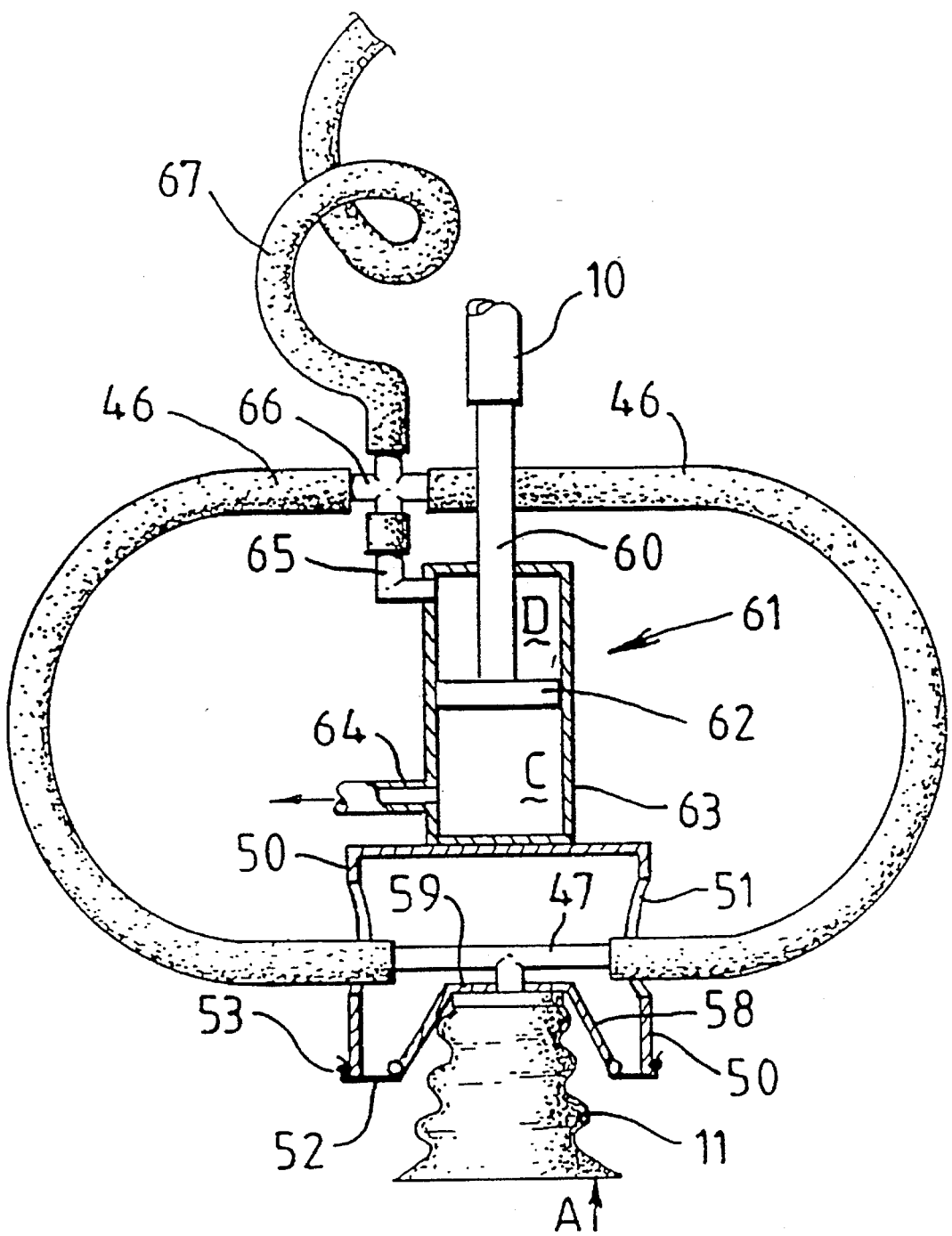

By way of example only, certain specific embodiments of suction cup assembly of this invention will now be described in detail, reference being made to the accompanying drawings, in which: FIG. 1 is a side view of a first embodiment of suction cup assembly of this invention; FIG. 2 is a view of the assembly of FIG. 1, taken in the direction of arrow II marked thereon; FIG. 3 is a perspective view of the assembly of FIGS. 1 and 2; FIGS. 4 and 5 are respectively a vertical sectional view and an end view on a second embodiment of suction cup assembly of this invention; FIG. 6 is a vertical sectional view on a third embodiment of suction cup assembly of this invention; FIG. 7 is a vertical sectional view on a fourth embodiment of suction cup assembly of this invention; and FIG. 8 is a view on a modified form of the suction cup assembly shown in FIG. 7.

Referring initially to FIGS. 1 to 3, there is shown a first embodiment of suction cup assembly constructed and arranged in accordance with the present invention and intended for use in mushroom harvesting apparatus such as that described in our British Patent Specification No. 2,237, 491. The assembly comprises a hollow support rod 10 and a convoluted resiliently-flexible suction cup 11 mounted on the lower end of the rod 10 by means of a coupling indicated generally at 12. This coupling comprises two four-bar linkages each in the form of a trapezium, with the parallel bars thereof lying in substantially horizontal planes when the support rod is disposed vertically as shown in FIGS. 1 and 2, and when the linkages are not deformed from their rest states. The upper linkage comprises an upper member 13, a lower member 14, and two side members 15 pivotally connected at their ends to the ends of the upper and lower members 13 and 14 respectively. In a similar way, the lower linkage comprises an upper member 16, a lower member 17, and side members 18 pivoted to the ends of members 16 and 17. The upper member 16 of the lower linkage extends through the space defined by the members of the upper linkage and is connected to the lower member 14 of the upper linkage by means of a spacer block 19 (FIG. 3). Helical tension stabilising springs 20 extend from the upper member 13 of the upper linkage to the upper member 16 of the lower linkage, and further helical tension stabilising springs 21 extend from the lower member 14 of the upper linkage to the lower member 17 of the lower linkage. These springs serve to bias the coupling 12 to a stable rest position as shown in FIGS. 1 and 2, with deformation of the linkages being possible only against the action of said springs.

The suction cup 11 has at its upper end a mounting boss 23 by which the cup is mounted on the lower member 17 of the lower linkage. The cup defines at its lower end 24 an open mouth through which air may be drawn. The peripheral wall of the cup defining that mouth is adapted to contact a mushroom cap and effect a seal thereagainst, whereby suction applied to the cup 11 will cause the cup to attach securely to the mushroom cap.

The linkages are designed so that the projections of the side members 15 and 18 (shown in broken lines in FIGS. 1 and 2) meet at a point 25, disposed on the axis of the cup 11, within the mouth of that cup at the lower end thereof. In this way, deformation of the linkages by applying a one-sided force to an edge of the cup 11, for example as shown by arrow A marked on FIG. 1, will cause the cup 11 partially to compress on one side and also to pivot as shown by arrow B, with the effective centre of pivoting being defined by point 25.

Suction is applied to the cup 11 by means of a flexible pipe 26, fitted at its lower end to a right angle connector 27 communicating through boss 23 with the interior of the cup 11. The upper end of pipe 26 is fitted to another right angle connector 28 which communicates with the interior of the support rod 10. The upper end of the support rod (not shown) is coupled to a low-pressure source, whereby air will be drawn through the cup 11, through pipe 26 and along the support rod 10.

FIGS. 4 and 5 show a second embodiment of coupling of this invention, utilising a gimbal arrangement to allow pivotal movement of the suction cup 11. In this arrangement, the mounting boss 30 at the upper end of the suction cup 11 is surrounded by and pivoted to a ring 31, and that ring is surrounded by and pivoted to the lower end 32 of a generally conical sleeve 33 As shown in FIG. 5, the pivotal axes of the two pivotal connections just-described are mutually at right angles; the lower end 32 of the sleeve 33 together with the ring 31 thus define a gimbal assembly. Upon the application of one-sided force A to the lower edge of the suction cup 11 (as described above) will cause partial compression of the cup and also pivotal movement about an axis lying in the plane of the pivotal connections to the ring 31, and thus about the upper end of the suction cup 11.

The sleeve 33 is mounted on a support rod 11 by means of a collar 34. A Tee-connector 35 communicates with the interior of the rod 11, and two flexible pipes 36 place the arms of connector 35 in communication with a corresponding Tee-connector 37 fitted to the mounting boss 30 of the cup 11, to communicate with the cup interior. The sleeve 33 is formed with apertures 38 for the pipes 36. A centralising tension spring 39 has its ends attached to the two Tee-connectors 35 and 37, such that any pivotal movement of the cup 11 away from the position shown in FIG. 4 is against the bias provided by spring 39.

FIG. 6 shows yet another embodiment of suction cup assembly of this invention. In this assembly, there is provided Tee-connector 40 attached to the lower end of the rod 10, and a sleeve 41 secured to that connector by nut 42. A collar 43 is slidable within the sleeve, and is retained by a circlip 44 at the lower end of the sleeve. The cup 11 is mounted centrally on the collar 43 and a compression spring 45 serves to bias the collar 43 into engagement with the circlip 44.

As with the last-described embodiment, a pair of flexible pipes 46 serve to interconnect the Tee-connector 40 provided at the lower end of the rod 10 with a similar connector 47 fitted to the mounting boss at the upper end of the cup 11, to communicate with the interior thereof. In this way, air may be drawn through the cup 11 by applying a reduced pressure to the rod 10. The pipes 46 pass between the turns of the spring 45 adjacent the connector 47 and through apertures 48 formed in the sleeve 40.

In the case of a one-sided force A being applied to the lower edge of the suction cup 11, the cup will partially compress but will also pivot, about the point of contact between the collar 43 and the circlip 44, diametrically opposed to the effective point of application of force A. However, the collar 43 may also slide linearly within the sleeve 41 and so the spring 45 affords a degree of compliance to the coupling, which may serve to absorb forces which would otherwise be imparted to a mushroom cap being harvested upon downward movement of the assembly, as a whole, to contact that cap.

FIG. 7 shows a fourth embodiment of suction cup assembly of this invention, somewhat similar to that shown in FIG. 6, and insofar as the two embodiments utilise similar components, those components are given like reference characters and will not be described in detail again here. Mounted on the lower end of the upper Tee-connector 40 is a sleeve 50 having apertures 51 through which the vacuum pipes 46 pass, to communicate with the lower Tee-connector 47 and so with the interior of the suction cup 11. Stretched across the lower end of the sleeve 50 is a flexible rubber membrane 52, held in place by means of an external O-ring 53, received partially within an annular groove formed in the outer surface of the sleeve 50, adjacent its lower end. The membrane 52 has a central aperture, and the edges of that membrane defining the aperture are received in a groove 54, formed in a mounting boss 55 provided at the upper end of the suction cup 11.

If a one-sided force A is applied to the lower edge of the suction cup 11, the cup will tend partially to compress and also to pivot about an effective pivotal centre lying more or less in the plane of the membrane 52, on the axis of the cup. Also, the membrane permits the cup 11 to move resiliently to a small extent with respect to the support rod 10. In other respects, this fourth embodiment of the invention behaves in a generally similar manner to that described above, for the other embodiments.

FIG. 8 shows a modification of the fourth embodiment illustrated in FIG. 7 and like components are given like reference characters and will not be described in detail again here. In this modified form of the fourth embodiment, a skirt 58 of a light-weight rigid material (such as aluminium) is secured to the upper end of the cup 11, so as to surround part of the axial length of the cup. The skirt is of a conical shape and its depth is selected so that the plane of the free part of the membrane 52 lies part-way between the ends of the cup 11, and approximately in the plane of the mouth of the cup, when compressed. The cup is advantageously fitted to the sleeve 52 by positioning the skirt 58 within the sleeve, and then laying the membrane 52 over the sleeve, the membrane having only a small central opening for the Tee-connector 47. After the outer periphery of the membrane has been secured to the sleeve by means of O-ring 53, the cup may be offered to the membrane and the skirt 58 pulled down, for example by means of bolts (not shown) fitted internally within the cup, and threaded into the top wall 59 of the skirt. This has the advantage of uniformly tensioning the membrane and clamping it to the cup.

The assembly shown in FIG. 8 includes a piston rod 60 is attached co-axially to the lower end of the support rod 10. The piston rod 60 is a part of a ram 61 including a piston 62 mounted on rod 60 and a cylinder 63. The sleeve 50 is mounted on the lower end of the cylinder 63 and the space C within the cylinder, between the piston 62 and the sleeve 50, is vented to atmosphere through port 64.

The space D within the ram between the piston 62 and the upper end of the cylinder 63 is connected through port 65 to a four-way connector 66, two of the arms of which receive the flexible pipes 46 communicating with the interior of the cup 11. The fourth arm of the connector 66 receives a further flexible pipe 67, communicating with a pressure source (not shown) selectable between sub-atmospheric pressure and super-atmospheric pressure.

Deflection of the cup 11 occurs in the same manner as has been described above with reference to FIG. 7, should a one-sided force be applied thereto. However, when a low-pressure source is connected to pipe 67, a reduced pressure exists within chamber D, due to the pressure drop in the pipes 46 and across any filter which may be provided within the cup 11—for example, a block of porous foamed material (not shown). This reduced pressure will cause the ram 61 to move to its fully extended position but since the pressure drop within the pipes 46 is relatively small, the ram will be extended with only a relatively small force.

When the support rod 10 is moved to contact the cup 11 with the cap of a mushroom, the ram 61 may contract against the force provided by the reduced pressure in chamber D, so giving compliance to the system, in addition to the pivotal compliance afforded by the rubber membrane 52. Of course, upon the cup 11 making a seal to a mushroom tap, the pressure in chamber D will fall so as subsequently to hold the ram in the fully extended position, during the harvesting of the mushroom and on subsequent movement thereof to a discharge site. There, a super-atmospheric pressure source may be connected to the pipe 67, so blowing the mushroom free from the cup 11 and simultaneously applying pressure to chamber D of the ram, causing the ram to contract and so lift the suction cup 11 clear of the released mushroom.

The above described arrangement could be modified to provide separate control for the ram 61, apart from the suction or pressure applied to the cup 11. In this case, port 65 of the ram would be connected to an appropriate pressure source through a controller, to permit fine high-speed control the position of the cup.

We claim:

1. A suction cup assembly comprising a suction cup having at one end thereof an open mouth for contacting an article, the suction cup being compressible in the axial direction thereof, a support member and a coupling mounting the other end of the cup on to an end portion of the member, the coupling being arranged to allow the cup to perform a generally pivotal movement with respect of the axis of the member, characterized in that the coupling includes means to control the effective center of said generally pivotal movement to lie substantially in the plane of the mouth of the suction cup.

2. A suction cup assembly as claimed in claim 1, wherein the coupling includes means biasing the cup away from the support member.

3. A suction cup assembly according to claim 2, wherein the biassing means comprises a ram disposed between the support member and the cup, which ram is adapted to be connected to a low pressure source in such a way that the ram is expanded when low pressure is applied thereto.

4. A suction cup assembly according to claim 3, wherein a single low pressure source is connected to the ram and to the suction cup, by means of a common low pressure line leading to the suction cup assembly.

5. A suction cup assembly as claimed in claim 4, wherein the coupling is arranged to have the effective centre of pivotal movement of the suction cup substantially within the confines of or closely adjacent the suction cup.

6. A suction cup assembly comprising a suction cup having at one end thereof an open mouth for contacting an article, a support member and a coupling mounting the other end of the cup on to an end portion of the member, the coupling including a sleeve mounted on the end portion of the support member, a resilient membrane extending over the end of the sleeve remote from the support member and said other end of the suction cup being carried by the membrane such that the cup may perform a generally pivotal movement with respect to the axis of the support member by resilient deformation of the membrane.

7. A suction cup assembly according to claim 6, wherein the membrane has a central aperture and the cup is mounted within said aperture.

8. A suction cup assembly according to claim 6, wherein there is provided a skirt for the suction cup, depending from said other end thereof towards the mouth end of the cup, the membrane extending between the sleeve and the free end of the skirt.

9. A suction cup assembly as claimed in claim 6, wherein the coupling is arranged to have the effective centre of pivotal movement of the suction cup substantially within the confines of or closely adjacent the suction cup.

10. A suction cup assembly comprising a suction cup having at one end thereof an open mouth for contacting fan article, a support member and a coupling mounting the other end of the cup on to an end portion of the member, the coupling comprising a first pivoted four-bar trapezium linkage having a pair of normally parallel unequal-length bars the longer bar of which is mounted on the support member, and a second pivoted four-bar trapezium linkage also having a pair of normally parallel unequal-length bars the longer bar of which is mounted on the shorter bar of the first linkage and substantially at right angles thereto, the suction cup being mounted on the shorter bar of the second linkage and the projections of the equal-length bars of the first and of the second linkages all normally substantially intersecting at a point, there being biassing means to apply a resilient restorative force to the linkages tending to keep the unequal-length bars of the two linkages substantially parallel, whereby the cup may perform a generally pivotal movement with respect to the axis of the support member.

11. A suction cup assembly as claimed in claim 10, wherein the coupling is arranged to have the effective centre of pivotal movement of the suction cup substantially within the confines of or closely adjacent the suction cup.

12. A suction cup assembly comprising a suction cup having at one end thereof an open mouth for contacting an article, a support member and a coupling mounting the other end of the cup on to an end portion of the member, the coupling comprising a sleeve mounted on the end portion of the support member, a collar slidably and tiltably disposed within the sleeve and a spring biassing the collar away from the support member, the cup being mounted on the collar whereby the cup may perform a generally pivotal movement with respect to the axis of the support member by the collar tilting within the sleeve.

* * * * *